United States Patent [19]

Leonhardt et al.

[11] 4,081,993
[45] Apr. 4, 1978

[54] DEVICE FOR MEASURING THE MAGNITUDE AND DIRECTION OF COMPRESSION FORCES

[75] Inventors: Joachim Leonhardt, Essen; Hans-Dieter Klein, Hattingen (Ruhr), both of Germany

[73] Assignee: Bergwerksverband GmbH, Essen, Germany

[21] Appl. No.: 791,599

[22] Filed: Apr. 27, 1977

[30] Foreign Application Priority Data

Apr. 28, 1976  Germany .............................. 2618538

[51] Int. Cl.$^2$ ................................................ G01N 3/08
[52] U.S. Cl. ..................................................... 73/88 R
[58] Field of Search ................ 73/88 R, 94, 88 E, 1 B

[56] References Cited

U.S. PATENT DOCUMENTS

| | | | |
|---|---|---|---|
| 3,161,174 | 12/1964 | Harrison | 73/88 E X |
| 3,572,091 | 3/1971 | McFarland | 73/88 R |
| 3,987,669 | 10/1976 | Daneshy | 73/88 R |

Primary Examiner—Jerry W. Myracle
Attorney, Agent, or Firm—Michael J. Striker

[57] ABSTRACT

A device for measuring compression forces, preferably compression forces acting on mine roof supports in an underground mine gallery, comprises a pair of spaced substantially parallel abutment plates between which a pressure body composed of a plurality of elongated parts of relatively brittle material and having respectively different resistance against compression forces are arranged, closely adjacent each other, and extending in longitudinal direction normal to the abutment plates to be subjected to compression forces acting in opposite directions on the abutment plates, whereby the parts will be respectively deformed to a different degree indicating thereby the magnitude of the compression forces.

16 Claims, 22 Drawing Figures

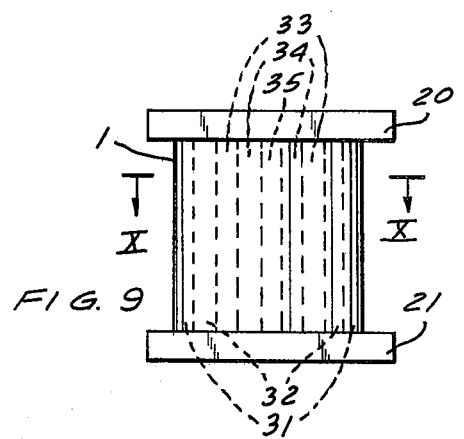
FIG. 9
FIG. 11
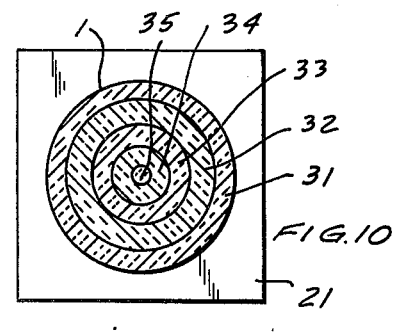
FIG. 10
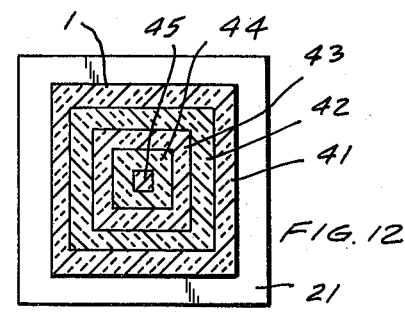
FIG. 12
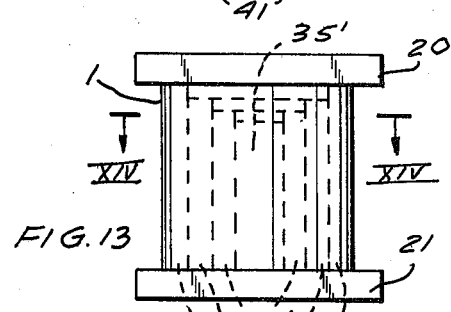
FIG. 13
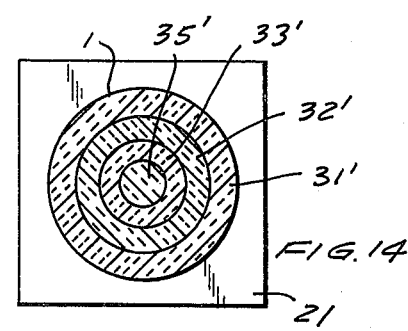
FIG. 14
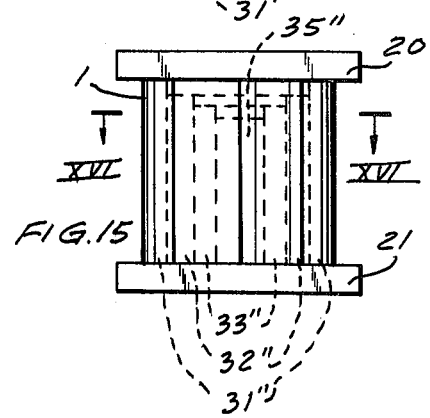
FIG. 15
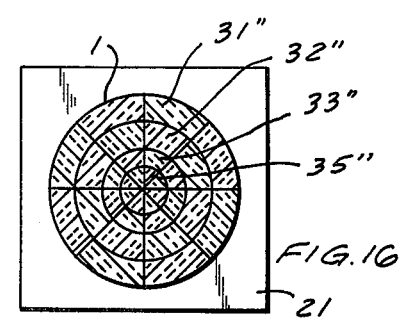
FIG. 16

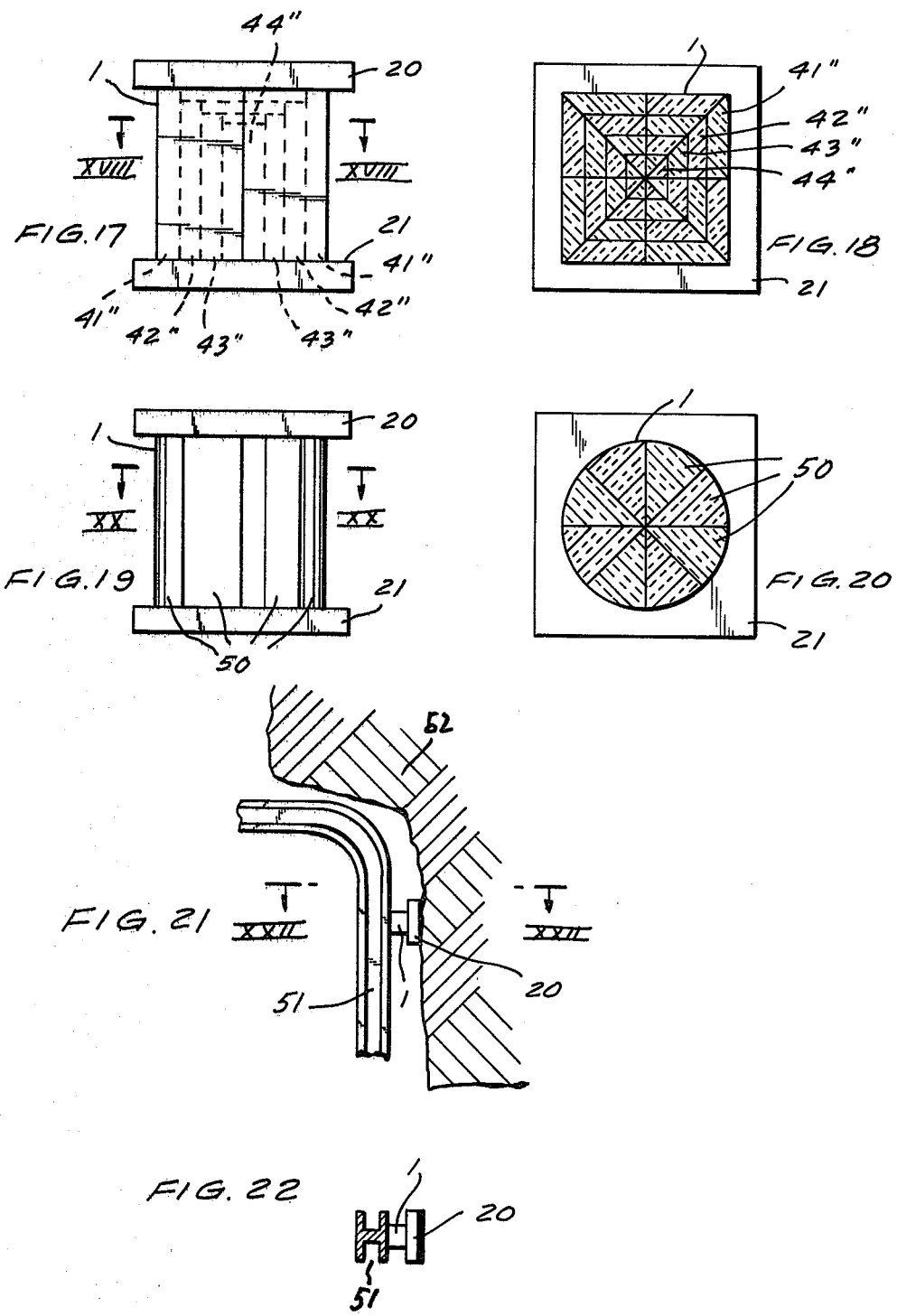

4,081,993

DEVICE FOR MEASURING THE MAGNITUDE AND DIRECTION OF COMPRESSION FORCES

BACKGROUND OF THE INVENTION

The present invention relates to a device for measuring of compression forces, preferably compression forces acting on mine roof supports in an underground mine gallery, whereby the deformation of a pressure body composed of a plurality of cylindrical or straight prisms of different materials, or of the same materials, but of different dimensions, serves as indication of the compression force, and in which the pressure body is arranged between two pressure plates of a stronger material than that of the pressure body.

A plurality of measuring devices and processes are known, for measuring dynamic and static compression and tension forces, for instance for a weighing or dosing function, for testing the strength of materials or for indicating deformations on devices and constructions.

For instance in mines, the forces prevailing on a support of an underground mine gallery may be measured by means of pressure cells, known in the art, which are arranged between the support and the surrounding rock or between connected parts of the support. Such pressure cells are constituted by steel containers filled with liquid and closed at one end by a membrane, which is deformed if outer forces act on the container. The indicated liquid pressure is, at a central application of the force, a direct indication of the force acting at the support. A disadvantage of such pressure cells is that they are inaccurate if the pressure forces act on the cell in a direction inclined to the axis thereof. The pressure cells are even often damaged or destroyed, if the direction of the force acting on the cell deviates to a considerable extent from the direction of the axis thereof. This will produce inaccurate measuring results, respectively no measuring results at all. Another disadvantage of known pressure cells is that they are relatively complicated in construction and in addition relatively expensive, so that their use, especially in underground mine galleries, is further limited.

Another measuring device to be used underground, the so-called prop inserting press, which is described in the DT-Gbm 1,897,012 is only usable in certain cases, due to its considerable weight and the required high effort of operating personnel. Furthermore, this device is only suitable to determine momentary values of forces acting on individual props. A plurality of measurements at the same location and under different conditions is however not possible with this device. The prop inserting press is also not suitable for all support constructions, for instance not for arc-shaped supports in an underground mine gallery.

In the German DT-OS 21 06 193 pressure cells of rubber-elastic or similar material are described which are filled with a liquid or a gas. The indicated pressure can be read at a closed system on hydraulic or pneumatic pressure indicators or on sight glasses, or be determined in an open system by a measuring tube. Such devices are also suitable for inclined loading. Their production is, however, relatively complicated.

The use of conventional tension-expansion-measuring processes in underground mine galleries is for safety reasons often not applicable (limited permission of electric operating means in underground mine galleries) and the practical application of such measurements is further limited to a high degree due to the detrimental conditions in underground mine galleries (danger of corrosion by water or salts, detrimental influence of dust).

This is likewise applicable with respect to the known "force absorbers" which operate on the principle of the tension-elongation-measuring technique (see for instance the magazine "Materialpruefung 17" (1975, No. 8, page 302).

From the testing of material pressure bodies of metal of high tensile strengths and yield point (calot-measuring gauge) are known, which serve for the calibration of material testing machines. The elastic deformation of the body serves as indicator of the magnitude of the force. The amount of deformation can be mechanically determined by a dial gauge, by means of mirrors, or by a microscope, or be electrically determined by means of a capacitive or inductive arrangement. The practical use of such measuring devices in underground mine galleries is however connected with the same difficulties as already mentioned above.

Devices are further known from the DT-OS 21 06 192 in which deformations occurring at different locations of a pressure body are measured, which serve to indicate the forces applied thereto. The deformations may for instance be measured by slide gauges, whereby also inclined forces may be measured. A measuring device of the above-mentioned kind is also known in which the fracture of a pressure body of predetermined pressure resistance indicates surpassing of a load. A plurality of pressure bodies (disks), which are arranged parallel to each other and normal to the direction of the pressure force, and having different dimensions or different resistance against compression, permit a stepwise indication of the acting force. These small, light, easily manipulatable and also cheeply manufacturable measuring devices, which may be manufactured in large numbers and which are indifferent against explosions, dust, corrosion and temperature changes so as to satisfy the requirements of rough operation, to stand up under continuous load, and which are independent of any addition of energy (for instance electrical current, hydraulic) and which in addition due to their low price do not have to be recovered after the measuring process, have proven practical and usable especially for indicating of central forces. It has however been shown that, even though no high claim is usually placed in such measuring devices with respect to the exactness of the forces to be measured, these measuring devices are, especially for the determination of inclined acting forces, not very suitable.

SUMMARY OF THE INVENTION

It is an object of the invention to further develop a measuring device of the aforementioned kind, so that the measuring device is suitable to determine central, as well as inclined acting forces, to indicate the magnitude and direction of such forces, especially forces acting on supports in an underground mine gallery.

It is a further object of the present invention to provide for such measuring devices which can be produced at a very low cost and which are suitable for use in underground mine galleries.

With these and other objects in view, which will become apparent as the description proceeds, the device for measuring compression forces, preferably compression forces acting on supports in an underground mine gallery, mainly comprise a pair of spaced substantially parallel abutment members adapted to be subjected on faces thereof directed away from each other to opposite compression forces to be measured, and a pressure body composed of a plurality of elongated parts of relatively brittle material and having respectively different resistance against compression forces, in which the parts are arranged closely adjacent to each other between the abutment members and extending in longitudinal direction substantially normal thereto, that is substantially parallel to the compression forces applied, to be subjected to such compression forces acting on the abutment members, whereby the parts of the pressure body will be deformed, respectively break, during the loading thereof at the reaching of their respective compression strengths, indicating thereby the magnitude of the compression forces. The breakage process proceeds from one loading step to the next. The various parts may be formed from the same material, but having different transverse dimensions, in which case the thinner parts will break before the heavier ones. The parts may also be formed with the same dimensions, while being formed of material of different resistance against compression forces, in which case the parts having a smaller resistance against pressure forces will break first. The pressure bodies, respectively the parts thereof, may be arranged between the abutment members or abutment plates in such a manner that they are adapted to indicate the magnitudes and the directions of the forces which can be respectively expected.

For a better distribution of the forces to be introduced into the measuring device it is, for instance, possible to construct the pressure body in such a manner that the plurality of parts thereof are constituted by a plurality of plates and wherein the plurality of plates includes pairs of plates having identical resistance against compression and in which the plates of each pair are symmetrically arranged with regard to a plane of symmetry of the compression body, so that the plates of each pair, at a central loading of the device, will, upon reaching of a breaking load, break simultaneously, however, during application of an inclined load break one after the other, or only at one side of the plane of symmetry. The loading limit may be determined by a variation of the size and thickness of the plates, the compression strength thereof, or the form or brittleness thereof, whereby corresponding combination of these features for each special case are possible.

By an inclined loading in an unknown direction it is advantageous to use for the parts of the compression body, instead of plates, cylinders and/or hollow cylinders or prisms and/or hollow prisms, whereby the above-mentioned possibilities of combinations with respect to the size, compression strength, form or brittleness, are likewise possible.

In this way it is possible to determine not only the magnitude of the acting load, but also the direction in which this load is applied.

If applicable abutments for the reception and distribution of the forces are present (for instance a support part or the surface of the surrounding rock), the usually provided abutment plates may be replaced by such abutment means.

In order to uniformly distribute the acting forces over the cross-section of the pressure body, the abutment plates may be formed from a material of a low modulus of elasticity.

The various parts of the pressure body may also have different lengths, which likewise assures a favorable introduction of the acting compression forces. In order to better recognize the direction of inclined applied forces, the various parts of the pressure body may preferably be divided into sectors. The breakage of one or a plurality of sectors indicates then the respective direction of the pressure forces. Partial loads can in this way also be easily determined.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 9 is a front view of a pressure body, in which the various parts thereof are constituted by hollow cylinders and a central solid cylinder inserted into each other;

FIG. 10 is a cross-section taken along the line X—X of FIG. 9;

FIG. 11 is a front view of a pressure body, in which the various parts thereof are constituted by hollow prisms and a central prism inserted into each other;

FIG. 12 is a cross-section taken along the line XII—XII of FIG. 11;

FIG. 13 is a front view similar to that shown in FIG. 9, in which the cylinder and the plurality of hollow cylinders have however different lengths;

FIG. 14 is a cross-section taken along the line XIV—XIV of FIG. 13;

FIG. 15 is a front view of a pressure body similar to that shown in FIG. 13, in which however the various cylinders are divided in longitudinally extending sections;

FIG. 16 is a cross-section taken along the line XVI—XVI of FIG. 15;

FIG. 17 is a front view of a pressure body similar to FIG. 11, in which the various prisms have not only different lengths, but in which each prism is divided into a plurality of longitudinally extending sections;

FIG. 18 is a cross-section taken along the line XVIII—XVIII of FIG. 17;

FIG. 19 is a front view of a pressure body constituted by a cylinder which is divided into a plurality of longitudinally extending sections;

FIG. 20 is a cross-section taken along the line XX—XX of FIG. 19;

FIG. 21 shows a pressure body located between an arc-shaped support member of an underground mine gallery and the surrounding rock; and FIG. 22 is a cross-section taken along the line XXII—XXII of FIG. 21.

DESCRIPTION OF THE PREFERRED EMBODIMENTS

Figure 1:
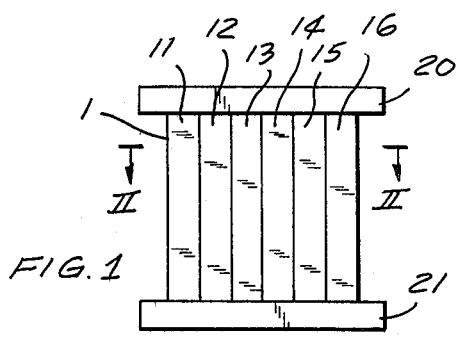
FIGS. 1, 3, 5 and 7 respectively illustrate a pressure body of the measuring device in front view, in which the pressure body is composed of plates of different characteristics.
Figure 2:
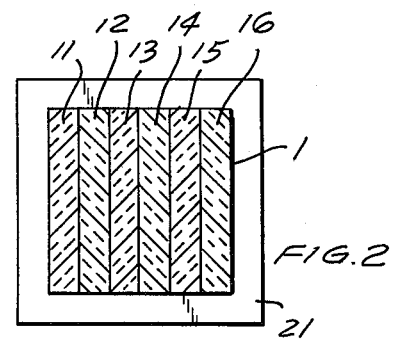
FIGS. 2, 4, 6 and 8 are respectively cross-sections respectively taken along the lines II—II, IV—IV, VI—VI, and VIII—VIII through the pressure bodies respectively illustrated in FIGS. 1, 3, 5 and 7.

FIG. 1 illustrates a measuring device according to the invention in which the pressure body 1 is composed of for instance six plates 11, 12, 13, 14, 15 and 16 of equal size, but different material characteristics, which are arranged normal to the pressure or abutment plates 20, 21 which engage opposite end faces of the plurality of plates 11–16. FIG. 2 illustrates the device shown in FIG. 1 in cross-section. The plates 11–16 may respectively be formed of materials of different brittleness, for instance from ceramics, glass or plastic material, which on application of pressure will break in predetermined steps in order to indicate in this way the respective loading of the device, whereby the compression forces should act in axial direction on the pressure body or, in which the plates 11–16 at an inclined loading in a predetermined direction, should be arranged normal to the projection of the inclined forces onto the abutment plates 20 and 21.

Figure 3:
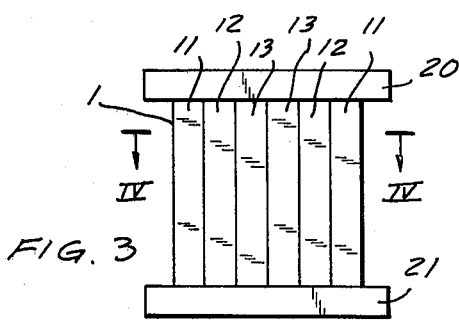
Figure 4:
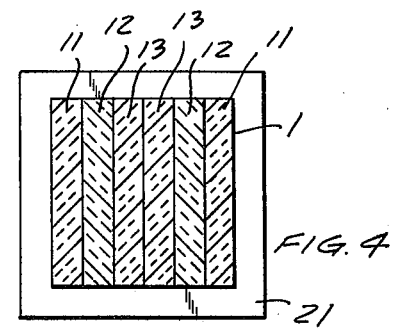

FIGS. 3 and 4 illustrate another measuring device in which the plurality of plates of the pressure body 1 consists of pairs of plates 11, respectively 12, respectively 13, in which the plates in each pair have identical material characteristics and identical dimensions differing from those of the other pairs, in which the pairs of plates are arranged symmetrically with respect to a plane of symmetry of the pressure body 1. By the symmetrical arrangement of the pairs of plates 11, respectively 12, respectively 13, a recognition of two preferred force directions is possible.

Figure 5:
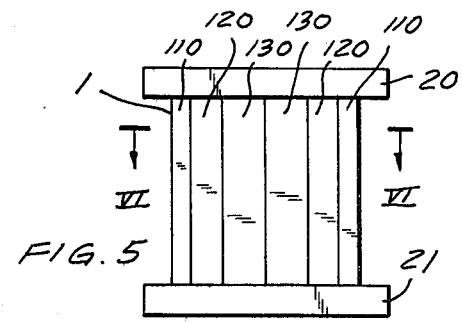
Figure 6:
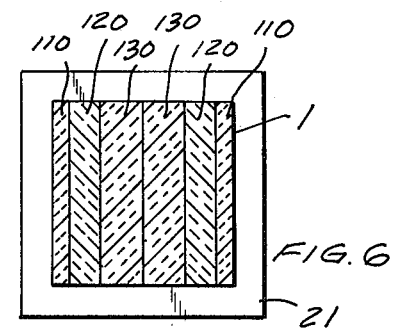

In the embodiment illustrated in FIGS. 5 and 6, the pressure body 1 is constituted by symmetrically arranged pairs of plates 110, respectively 120, respectively 130 of different material characteristics, and of different dimensions, so that with this device forces of different magnitude and acting in two preferred directions may be determined.

Figure 7:
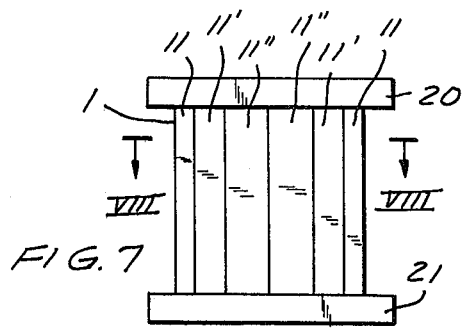
Figure 8:
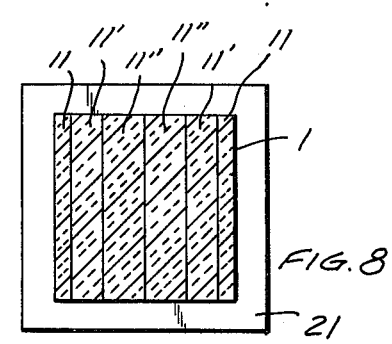

FIGS. 7 and 8 illustrate a further embodiment of a simplified measuring device in which the pressure body 1 consists of pairs of symmetrically arranged plates 11, 11', 11" of different dimensions, but of equal specific strengths.

FIGS. 9 and 10 illustrate a measuring device in which the pressure body 1 is constituted by a plurality of hollow cylinders 31, 32, 33, 34 and a central solid cylinder 35, which are inserted into each other, whereas the pressure body illustrated in FIGS. 11 and 12 is constituted by a plurality of hollow prisms 41, 42, 43, 44 and a central solid prism 45 inserted into each other, in which the cylinders or prisms have respectively different characteristics.

A further modification of the measuring device is illustrated in FIGS. 13 and 14 in which the pressure body 1 consists of hollow cylinders 31', 32', 33' and a central solid cylinder 35' inserted one into the other, whereby the height of the cylinders decreases from the outer to the innermost.

FIGS. 15 and 16 illustrate a further development of the measuring device illustrated in FIGS. 13 and 14 in which the hollow cylinders and the central cylinder of the pressure body 1 are respectively divided into sectors 31", 32", 33" and 35" in order to ascertain in this way during application of inclined forces the direction of such forces.

FIGS. 17 and 18 illustrate a similar further development of the device in which the hollow prism and the central prism of the pressure body 1 are divided into sectors 41", 42", 43" and 44".

In the embodiments shown in FIGS. 9–18 the various cylinders or prism inserted into each other are constructed in such a manner that their resistance against compression increases from the outermost toward the innermost element, so that the outer elements will break first under increasing loads.

FIGS. 19 and 20 illustrate again a simplified measuring device provided with a cylindrical pressure body 1, which is divided into sectors 50 of different resistance against compression.

FIGS. 21 and 22 show a pressure body 1, which may be constructed in any of the above described ways, inserted between an arc-shaped support member 51 and the surrounding rock 52 in an underground mine gallery whereby one or both abutment plates may be omitted.

It will be understood that each of the elements described above, or two or more together, may also find a useful application in other types of devices for measuring compression forces differing from the types described above.

While the invention has been illustrated and described as embodied in a device for measuring of compression forces, preferably compression forces acting on supports in an underground mine gallery, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for measuring compression forces, preferably compression forces acting on supports in an underground mine gallery, comprising a pair of spaced substantially parallel abutment members adapted to be subjected on faces thereof directed away from each other to opposite compression forces to be measured; and a pressure body composed of a plurality of elongated parts of relatively brittle material and having respectively different resistance against compression forces, said parts being arranged closely adjacent to each other between said abutment members and extending in longitudinal direction substantially normal thereto to be subjected to the compression forces acting on said abutment members, whereby said parts of said pressure body will be deformed to a different degree, indicating thereby the magnitude of the compression forces.

2. A device as defined in claim 1, wherein said abutment members are constituted by a pair of substantially parallel plates.

3. A device as defined in claim 2, wherein at least one of said plates constituting said abutment members consists of a material having a low modulus of elasticity to substantially equalize the introduction of the compression forces to said pressure body when such compression forces are applied eccentrically or inclined at an angle of less than 90° with respect to said abutment members.

4. A device as defined in claim 2, wherein said pressure body is arranged between a support and the surrounding rock in an underground mine gallery with at least one of said support plates omitted.

5. A device as defined in claim 1, wherein said plurality of parts of said pressure body are constituted by a plurality of plates having side faces substantially normal to said abutment members and abutting against each other and having opposite end faces respectively abutting against said abutment members.

6. A device as defined in claim 5, wherein said plurality of plates include pairs of plates composed of material of identical resistance against compression but differing from the resistance of the other pairs of plates, wherein the plates of each pair are arranged symmetrically with respect to a plane of symmetry of said compression body.

7. A device as defined in claim 5, wherein said plurality of plates include pairs of plates having identical dimensions but differing from those of the other pairs of plates, and wherein the plates of each pair are arranged symmetrically with respect to a plane of symmetry of said compression body.

8. A device as defined in claim 1, wherein said plurality of parts are constituted by a plurality of hollow cylinders of different diameters inserted concentrically into each other and a central solid cylinder inserted in the hollow cylinder of smallest diameter.

9. A device as defined in claim 8, wherein the cylinders of said plurality of cylinders have respectively different lengths.

10. A device as defined in claim 8, wherein the brittleness of the cylinders of said plurality of cylinders decreases from the outermost toward the innermost of said plurality of cylinders.

11. A device as defined in claim 8, wherein each of said cylinders of said plurality of cylinders is divided into a plurality of sections.

12. A device as defined in claim 1, wherein said plurality of parts are constituted by a plurality of hollow prisms of different free cross-sectional areas concentrically inserted into each other and a central solid prism inserted into the hollow prism of smallest free cross-sectional area.

13. A device as defined in claim 12, wherein the prisms of said plurality of prisms have respectively different lengths.

14. A device as defined in claim 12, wherein the brittleness of the prims of said plurality of prisms decreases from the outermost towards the innermost of said plurality of prisms.

15. A device as defined in claim 12, wherein each of said prisms of said plurality of prisms is divided into a plurality of sections.

16. A device as defined in claim 1, wherein said plurality of parts of said pressure body constituted by sectors of equal dimensions but of different resistance against compression of a cylinder.

* * * * *